United States Patent [19]
Knight et al.

[11] 3,854,393
[45] Dec. 17, 1974

[54] APPARATUS FOR PRODUCING PREPARED HASH BROWN POTATO PRODUCT

[75] Inventors: James T. Knight; Glen R. Green, both of Ontario, Oreg.

[73] Assignee: Ore-Ida Foods, Inc., Ontario, Oreg.

[22] Filed: Jan. 22, 1973

[21] Appl. No.: 325,611

Related U.S. Application Data

[62] Division of Ser. No. 200,828, Nov. 22, 1971.

[52] U.S. Cl. .............................................. 99/443 C
[51] Int. Cl. ........................... A23b 7/06, A23l 1/12
[58] Field of Search ............. 99/401, 403, 404, 405, 99/406, 407, 443 R, 443 C, 416, 417, 470, 473, 474, 475; 426/444, 421

[56] References Cited
UNITED STATES PATENTS

| | | | |
|---|---|---|---|
| 2,355,798 | 8/1944 | Guthier | 99/443 C |
| 2,551,148 | 5/1951 | McBeth | 99/443 C |
| 2,597,066 | 5/1952 | Chase | 426/444 X |
| 3,086,868 | 4/1963 | Keifer | 99/443 C X |

*Primary Examiner*—Donald E. Watkins
*Attorney, Agent, or Firm*—Mallinckrodt & Mallinckrodt

[57] ABSTRACT

A hash brown potato product made up of blanched potato shreds closely massed together as a merchandisable patty, preferably quick frozen, is mass produced by shredding peeled raw potatoes, passing blanching steam upwardly through a loosely laid bed of the raw shreds under sufficient pressure to dynamically maintain the individual shreds substantially separated, diffusing cooling air upwardly through the resulting loosely laid bed of blanched individual shreds, and forming the resulting bed of cooled blanched potato shreds into merchandisable patties preferably followed by quick freezing of such patties. The apparatus preferably comprises steam blanching and air-cooling chambers in series and an endless screen conveyor extending through such chambers and upon the feed end of which raw potato shreds are continuously deposited to provide a continuously traveling bed of loosely laid potato shreds and from the discharge end of which emerges a continuous strip of prepared hash brown potatoes that are formed into patties. Fluid-circulating means are provided for the blanching and cooling chambers to force the steam upwardly through the endless conveyor screen and through the loosely laid bed of raw potato shreds under sufficient pressure to maintain the individual shreds substantially separated during travel through such blanching chamber and to force the cooling air through the resulting bed of blanched potato shreds during travel through the cooling chamber or chambers.

7 Claims, 8 Drawing Figures

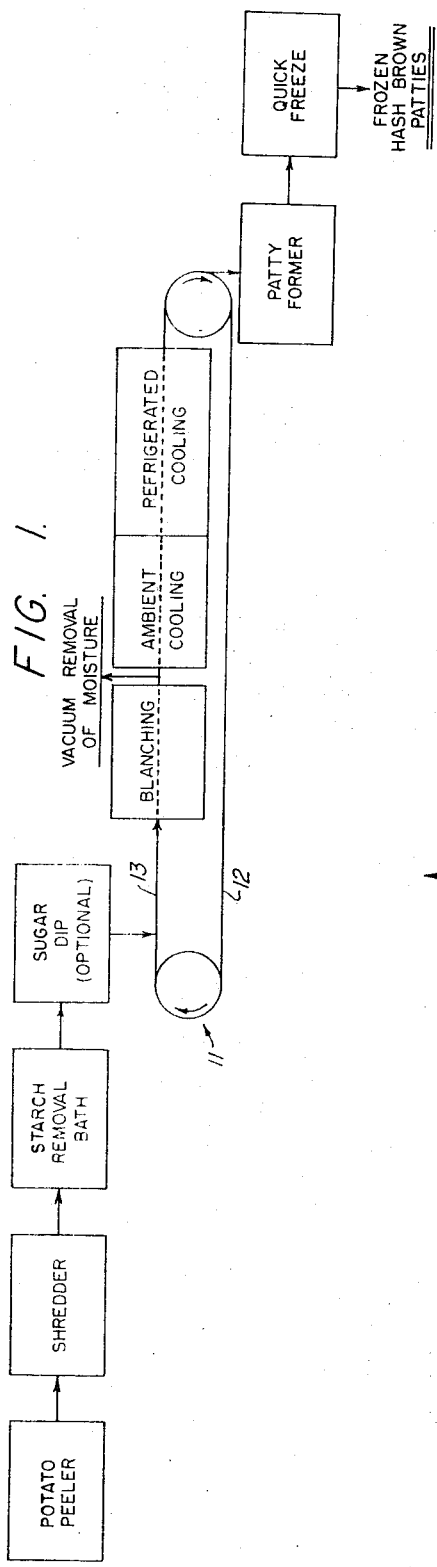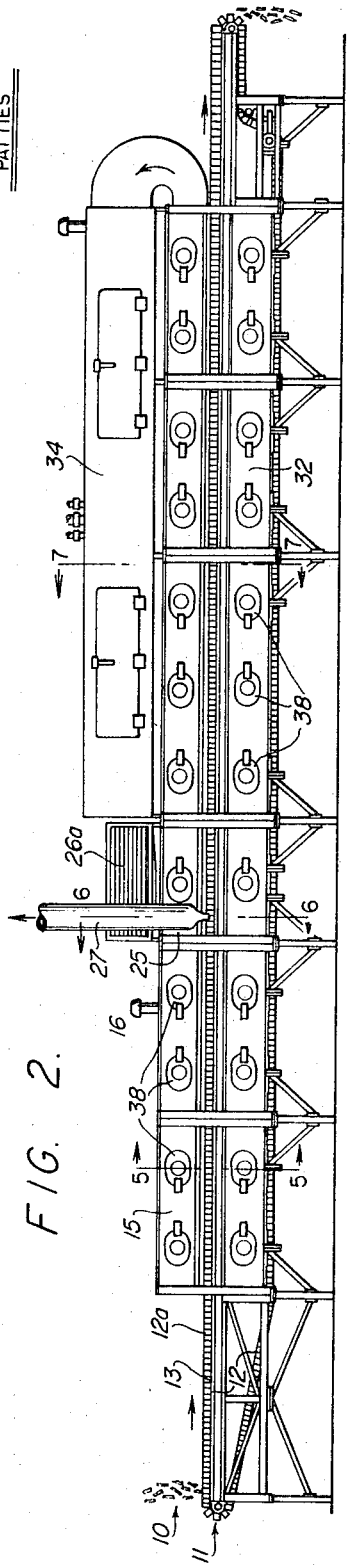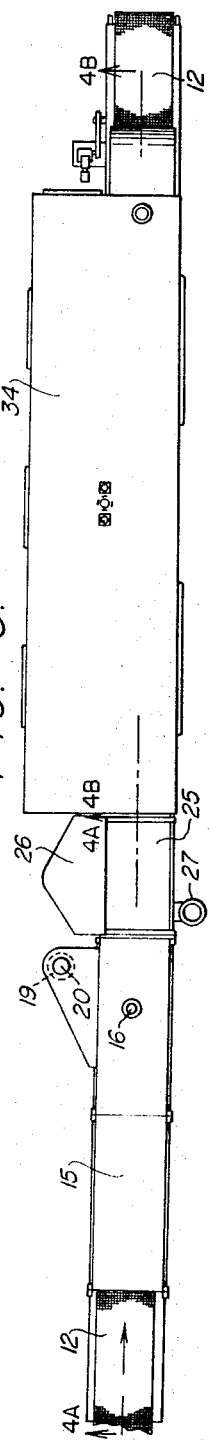

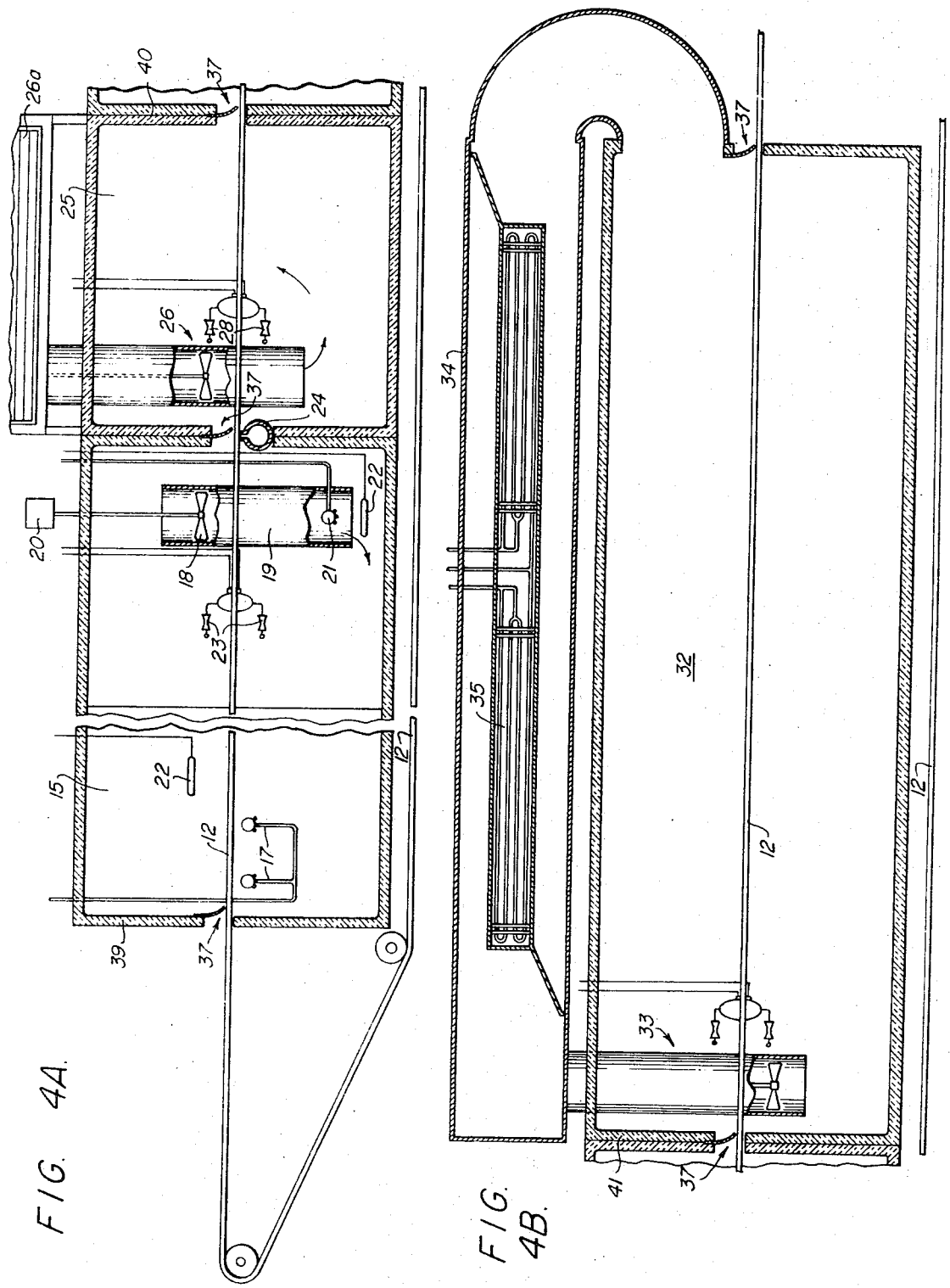

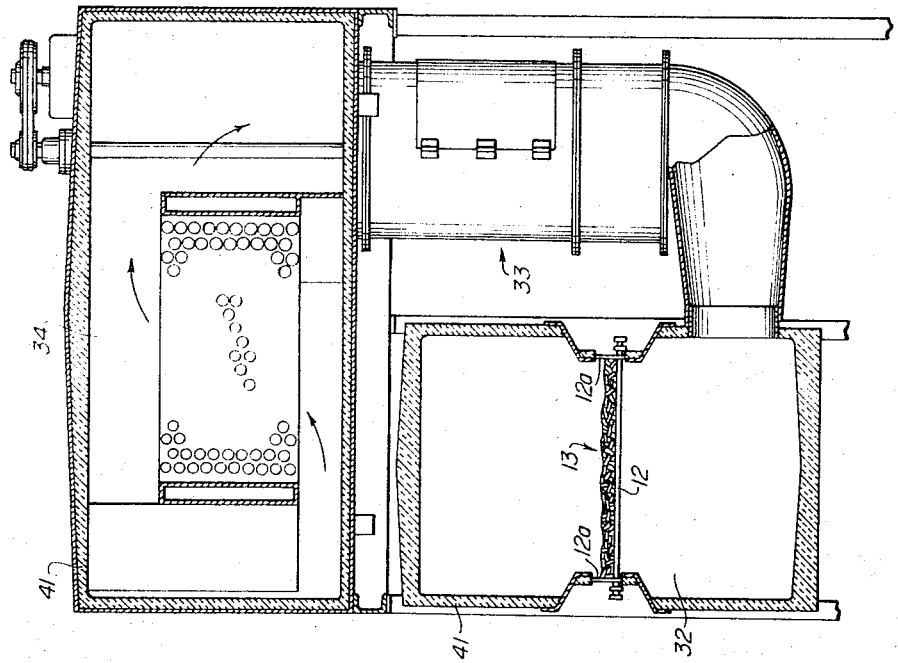
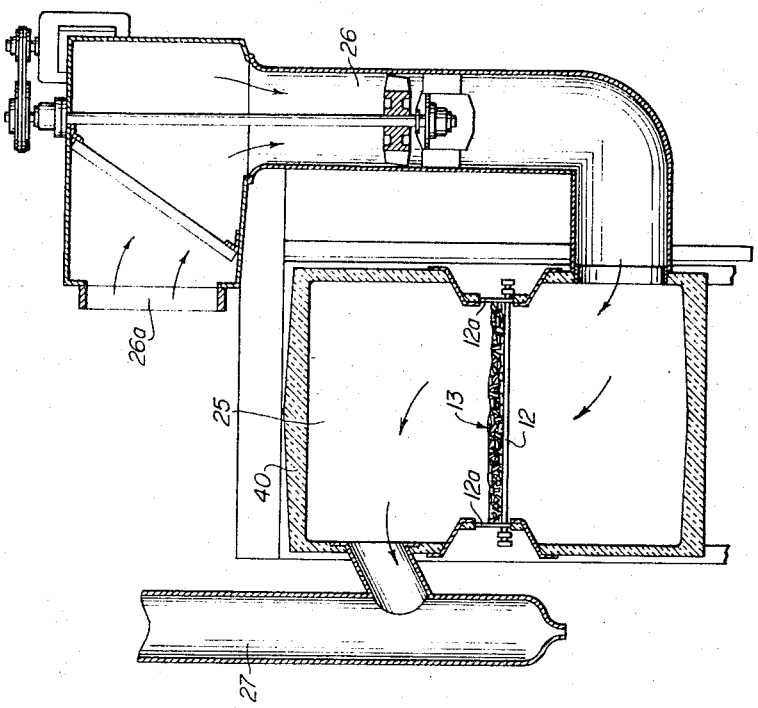

APPARATUS FOR PRODUCING PREPARED HASH BROWN POTATO PRODUCT

This is a division, of application Ser. No. 200,828, filed Nov. 22, 1971.

BACKGROUND OF THE INVENTION

1. Field

The invention is in the field of potato processing to produce prepared potato food products for the commercial market.

2. State of the Art

The customary way of commercially producing hash brown potatoes as a merchandisable product is to first blanch peeled whole raw potatoes and to then shred the blanched whole potatoes and form patties from the resulting shreds. The patties are usually quick frozen. This procedure has limitations in that the whole potatoes must be carefully sized if blanching is to be uniform, the shreds tend to mat together and produce a poor quality product, and processing in general is difficult.

Shredding whole raw potatoes and blanching the raw shreds by the use of either hot water or steam has been suggested heretofore (see U.S. Pat. Nos. 2,355,798 and 2,551,148), but this more desirable procedure has not been commercially practical heretofore, largely because of the difficulty of obtaining uniform blanching of the raw shreds.

There has long been a need for a process and apparatus that will overcome this difficulty.

SUMMARY OF THE INVENTION

In accordance with the present invention, whole raw potatoes are shredded and the raw shreds laid as a loose bed on a perforated support, preferably an endless screen conveyor. Blanching steam is passed upwardly through the support and through the bed of raw shreds under sufficient pressure to dynamically maintain the individual shreds substantially separated. After blanching is completed, cooling air is diffused upwardly through the support and the bed of blanched potato shreds to both remove moisture from the shreds and to cool them for subsequent processing steps, namely, for forming into patties and, usually, for deep freezing and packaging for the marketplace. When an endless screen conveyor is employed in a continuous production line, blanching is accomplished by the forced circulation of steam and air within a chamber largely sealed from the atmosphere, drying and preliminary cooling is accomplished in a next succeeding chamber through which atmospheric air is circulated, and final cooling is accomplished in a next succeeding chamber within which refrigerated air is circulated. In the blanching chamber, fluid circulation is upwardly through the conveyor screen and potato shred bed under sufficient pressure to dynamically maintain the individual shreds substantially separated so blanching is effectively accomplished with substantially uniform effect on the individual potato shreds. In the cooling and refrigeration chambers, fluid circulation is diffused upwardly through the bed of blanched shreds so as to preclude close matting together of the shreds.

THE DRAWINGS

In the accompanying drawings, which illustrate a specific embodiment of the process and apparatus representing the best mode presently contemplated of carrying out the invention, FIG. 1 is a block diagram schematically illustrating the process as carried out on a continuous basis;

FIG. 2, a view in side elevation of the apparatus for carrying out the blanching, ambient cooling, and refrigerated cooling steps of the process;

FIG. 3, a top plan view of the apparatus of FIG. 2;

FIG. 4A, an enlarged view in longitudinal vertical section taken through part of the length of the apparatus of FIG. 2, on the line 4A—4A of FIG. 2;

FIG. 4B, a similar sectional view taken through a next following part of the length of the apparatus, on the line 4B—4B of FIG. 3;

FIG. 5, a greatly enlarged view in transverse vertical section taken on the line 5—5 of FIG. 2;

FIG. 6, a view similar to that of FIG. 5 but reduced in size to approximately the scale of FIGS. 4A and 4B and taken on the line 6—6 of FIG. 2; and FIG. 7, a view similar to that of FIG. 6 taken on the line 7—7 of FIG. 2.

DETAILED DESCRIPTION OF ILLUSTRATED EMBODIMENT

Figure 5:
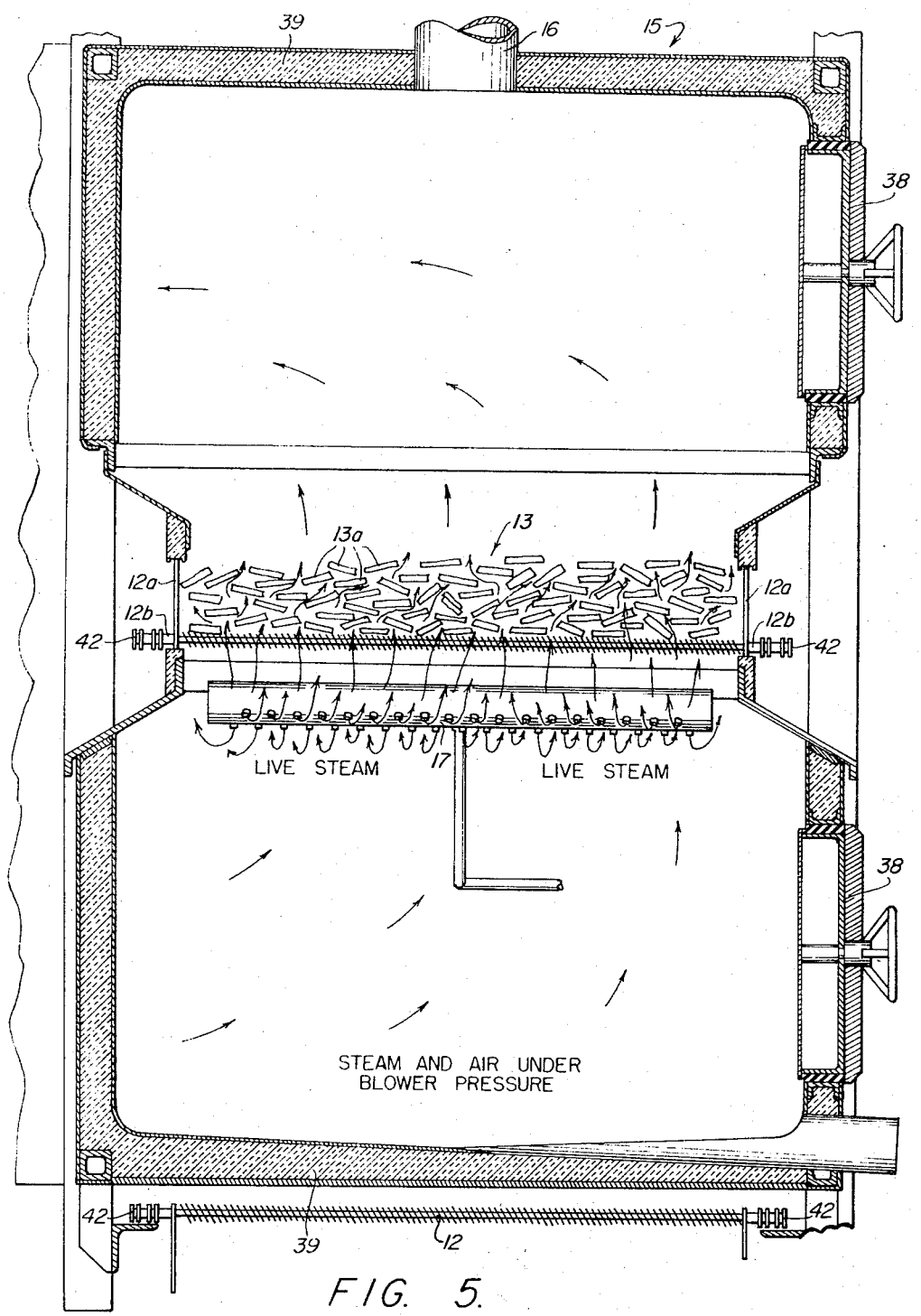

As illustrated, the process comprises peeling whole raw potatoes, including the removal of defects, followed by shredding of the peeled raw potatoes. These procedures may be and preferably are carried out in conventional manner by the use of well known equipment. Sizing of the whole raw potatoes is not necessary.

The raw shreds may be passed directly to the blanching stage of the process, but are preferably washed to remove free starch and dipped in a weak sugar solution prior to blanching.

The washed and dipped potato shreds are deposited as a continuous stream 10, FIG. 2, at the feed end of a conveyor 11 on an endless screen conveyor belt 12 of sufficient tight weave to effect dissemination of treatment fluids, as contrasted to channeling of such fluids. Stainless steel mesh designated commercially as 84-105-17-T304 has been found very satisfactory for the purpose. The deposited potato shreds form a loosely laid bed 13, FIGS. 1 and 5, of discrete shreds 13a, FIG. 5, between screen side guards 12a. It has been found advantageous to form bed 13 with a thickness of about 3½ inches.

Endless screen belt 12 serves to carry the bed 13 of potato shreds through a blanching stage, then through an ambient cooling stage, and finally through a refrigerated cooling stage. The resulting bed of shreds is then passed into a patty former, which may comprise rolls for pressing the loose shreds together and knives for cutting the resulting web of processed potato shreds into individual rectangular patties for passage through quick freezing equipment preparatory to packaging as a commercial hash brown potato product.

The blanching, ambient cooling, and refrigerated cooling stages involve the passing of steam, atmospheric air, and refrigerated air, respectively, upwardly through the perforations of conveyor screen 12 and through the loosely laid potato shreds 13a. The blanching fluid is passed through the screen and bed under sufficient pressure to dynamically maintain such shreds substantially separated and the cooling fluid is diffused through the resulting blanched shreds, see FIGS. 5, 6, and 7, respectively.

As illustrated, the apparatus advantageously comprises a series of closed chambers constructed and interconnected for continuous travel therethrough of the upper, i.e., working, run of screen conveyor belt 12.

The first chamber 15 in the line of conveyor belt travel is sealed, except for a relatively small, filter-provided, vent pipe 16, and is provided with a steam sparge 17 below conveyor belt 12 and directed downwardly into the path of fluid circulation within the chamber. The steam is circulated through the chamber by means of a blower arrangement disposed laterally of the chamber 15, see FIG. 3, and made up of a fan 18 positioned in an open-ended, vertical conduit 19 for rotation by an electric motor 20. Additional steam is advantageously introduced by a sparge 21 associated with the blower. The introduced steam and air within the chamber are circulated under sufficient pressure to dynamically maintain the potato shreds 13a substantially separated, see FIG. 5. Thus, blanching is carried out uniformly.

Temperature sensors 22 and differential pressure sensors 23 are connected with standard control instrumentalities (not shown) for controlling steam introduction and blower speed to maintain satisfactory blanching conditions, e.g., temperature within the range of from 175° to 190° F., and a satisfactory fluid circulation pressure, which will vary depending upon bulk density of the bed. For bulk density averaging 40 lbs/cubic foot, a flow velocity of fluid through the bed of from 100 to 115 feet per minute and a static pressure of from 1.0 to 2.5 inches of mercury within the chamber has been found to be the optimum.

In order to remove free moisture entrained in the mesh of the conveyor belt 12 before entry of such belt into the cooling chambers, moisture removal means, advantageously a vacuum nozzle 24, is provided below and across the width of the belt.

The second chamber 25 in the line of conveyor belt travel is provided with a corresponding blower arrangement, designated generally 26, arranged to draw atmospheric air into the interior of the chamber through a conduit 26a and to force it out through a stack 27 after diffusing it upwardly through the bed 13 of blanched shreds. Air pressure is controlled as in chamber 15 by differential pressure sensors 28. Ambient temperature of approximately 75°F., and air flow velocity through the bed and static pressure the same as in the first chamber 15 have been found optimum for bulk density of product as previously mentioned.

The third chamber 32 in the line of conveyor belt travel is also provided with a corresponding blower arrangement, designated generally 33, arranged to draw refrigerated air from a superimposed refrigeration chamber 34, equipped with refrigeration coils 35, and to diffuse such air upwardly through the traveling shred bed 13 and to circulate it back through chamber 34. Diffusion of air through the bed 13 of blanched potato shreds insures rapid and substantially uniform refrigerated cooling of the product. For bulk density of product as previously mentioned, temperature of 45°F. and air flow velocity through the bed and static pressure the same as in the preceding two chambers have been found to be the optimum.

Communication between the several chambers and with the outside atmosphere at the openings through which conveyor belt 12 travels is controlled by air seals 37, which may be of standard "Neoprene" baffle type.

Access to the interiors of the several chambers is through normally closed and sealed manways 38. The walls of all the chambers are preferably insulated, as indicated at 39, 40, and 41, FIGS. 5, 6 and 7, respectively. Screen conveyor belt is advantageously driven by roller chains 42, FIG. 5, engaging respective opposite ends of belt support rods 12b.

The processed potato shreds 13a fall from the discharge end of conveyor 11, see FIG. 2, into patty forming means of any suitable type, from where the formed patties are usually passed through a quick freezing stage, as indicated in FIG. 1, prior to being packaged as a merchandisable product.

It should be noted that, during the ambient and refrigerated cooling stages moisture is extracted from the blanched potato shreds. Thus, the final product should have a moisture content approximately in the range of from 78.0 to 80 percent by weight.

Whereas this invention is here illustrated and described with respect to a certain preferred form thereof, it is to be understood that many variations are possible without departing from the inventive concepts particularly pointed out in the claims.

We claim:

1. Apparatus for producing potato shreds useful in the forming of a prepared hash brown potato product, comprising means for shredding raw potatoes; a perforate support arranged to receive the shredded raw potatoes as a loosely laid bed; and means for forcing a hot blanching fluid upwardly through said support and said bed under sufficient pressure and diffused velocity to maintain the individual potato shreds substantially separated during blanching thereof, the perforations of said support being sufficiently small and numerous to diffuse said fluid throughout said bed such that localized channeling thereof will be substantially prevented.

2. Apparatus in accordance with claim 1, wherein the means for forcing the hot blanching fluid upwardly through the support and bed comprises a closed steam chamber within which the support is positioned; means for introducing steam into said chamber below said support; and blower means for circulating the steam within said chamber upwardly through said support.

3. Apparatus in accordance with claim 1, also including an ambient cooling chamber equipped with means for cooling the blanched potato shreds with ambient air and a refrigerated cooling chamber equipped with means for further cooling the blanched potato shreds with refrigerated air, said cooling chambers being in sequential series with the steam blanching chamber; and wherein the support is a conveyor equipped with an endless screen conveyor belt on which the shredded raw potatoes are deposited, said belt extending through the series of chambers.

4. Apparatus in accordance with claim 3, wherein moisture removal means are provided between the blanching chamber and the cooling chambers.

5. Apparatus in accordance with claim 3, wherein the means for cooling with ambient air comprises blower means in the ambient cooling chamber in communication with the outside atmosphere for drawing cooling air into said chamber and for diffusing it upwardly through the conveyor belt and the bed of shredded potatoes, and the means for cooling with refrigerated air comprises a refrigeration chamber in air flow communication with the refrigerated cooling chamber and blower means for circulating refrigerated air from said refrigeration chamber into the refrigerated cooling chamber and for diffusing it upwardly through the conveyor belt and the bed of shredded potatoes.

6. Apparatus in accordance with claim 1, wherein the support is housed within a substantially closed chamber, and the means for forcing a hot blanching fluid upwardly through the support and the bed of shredded raw potatoes thereon comprises a conduit connecting the upper part of the chamber above said support with the lower part of the chamber below the support, a blower fan in said conduit for circulating the air within the chamber from the said upper part thereof to the said lower part thereof and upwardly through said support and said bed, and means for introducing steam into the chamber.

7. Apparatus in accordance with claim 6, wherein the means for introducing steam into the chamber comprises a sparge below the support with its steam outlets directed downwardly, and a sparge within the conduit.

* * * * *